United States Patent
Zhuo

(10) Patent No.: US 10,701,556 B2
(45) Date of Patent: Jun. 30, 2020

(54) SYSTEMS AND METHODS FOR DETERMINING AN AFFINITY BETWEEN USERS

(71) Applicant: BEIJING DIDI INFINITY TECHNOLOGY AND DEVELOPMENT CO., LTD., Beijing (CN)

(72) Inventor: Chengxiang Zhuo, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/537,711

(22) Filed: Aug. 12, 2019

(65) Prior Publication Data

US 2019/0364422 A1 Nov. 28, 2019

Related U.S. Application Data

(63) Continuation of application No. PCT/CN2017/114977, filed on Dec. 7, 2017.

(30) Foreign Application Priority Data

Feb. 13, 2017 (CN) .......................... 2017 1 0076908

(51) Int. Cl.
*H04W 12/00* (2009.01)
*H04W 8/18* (2009.01)

(52) U.S. Cl.
CPC ....... *H04W 12/0052* (2019.01); *H04W 8/186* (2013.01); *H04W 12/0013* (2019.01); *H04W 12/00514* (2019.01)

(58) Field of Classification Search
CPC ......... H04W 12/0052; H04W 12/0013; H04W 12/00514; H04W 8/186
See application file for complete search history.

(56) References Cited

U.S. PATENT DOCUMENTS 7,072,858 B1 * 7/2006 Litzow ................... G06Q 30/02
705/14.69
7,493,647 B2 * 2/2009 White ................. H04N 7/17318
725/87

(Continued)

FOREIGN PATENT DOCUMENTS

CN 105005615 A 10/2015
CN 105045833 A 11/2015

(Continued)

OTHER PUBLICATIONS

STIC Search Strategy (Requested Feb. 10, 2020).*

(Continued)

*Primary Examiner* — Sharon S Lynch
(74) *Attorney, Agent, or Firm* — Metis IP LLC

(57) ABSTRACT

The present disclosure relates to systems and methods for determining an affinity between a target user and at least one candidate user. The systems may perform the methods to obtain a plurality of target service orders associated with the target user and a plurality of candidate service orders associated with the candidate user within a predetermined time period; select one or more relevant service orders from the plurality of candidate service orders based on the plurality of target service orders; and determine an affinity between the target user and the candidate user based on the one or more relevant service orders.

15 Claims, 7 Drawing Sheets

(56) References Cited

U.S. PATENT DOCUMENTS

| | | | | |
|---|---|---|---|---|
| 7,680,685 | B2* | 3/2010 | Ouimet | G06Q 10/04 705/7.29 |
| 7,770,786 | B1* | 8/2010 | Birch | G06Q 30/0207 235/375 |
| 8,135,505 | B2* | 3/2012 | Vengroff | G06Q 30/02 701/24 |
| 8,140,677 | B2* | 3/2012 | Chalasani | H04L 67/1095 709/221 |
| 8,539,359 | B2* | 9/2013 | Rapaport | G06Q 10/10 715/751 |
| 8,621,563 | B2* | 12/2013 | Sathish | G06F 16/90335 726/2 |
| 8,645,292 | B2* | 2/2014 | Flinn | G06N 7/02 706/12 |
| 9,384,493 | B2* | 7/2016 | Harris | G06Q 30/0201 |
| 9,449,336 | B2* | 9/2016 | Wilson | G06N 3/063 |
| 9,454,729 | B2* | 9/2016 | Flinn | G06Q 50/01 |
| 9,706,363 | B2* | 7/2017 | Colonna | H04W 4/029 |
| 2002/0116282 | A1* | 8/2002 | Martin | G06Q 20/202 705/37 |
| 2006/0010478 | A1* | 1/2006 | White | H04N 7/17318 725/102 |
| 2008/0021794 | A1* | 1/2008 | Vega | G06Q 20/10 705/14.66 |
| 2008/0091342 | A1* | 4/2008 | Assael | G01C 21/3438 701/533 |
| 2009/0005987 | A1* | 1/2009 | Vengroff | G06Q 30/02 701/300 |
| 2010/0205541 | A1* | 8/2010 | Rapaport | G06Q 10/10 715/753 |
| 2010/0207812 | A1* | 8/2010 | Demirdjian | G01S 13/825 705/1.1 |
| 2012/0041675 | A1* | 2/2012 | Juliver | G06Q 10/08 701/465 |
| 2012/0072263 | A1* | 3/2012 | Dusig | G06Q 30/02 705/7.32 |
| 2012/0254078 | A1* | 10/2012 | Bhatnagar | G06N 7/005 706/12 |
| 2012/0284105 | A1* | 11/2012 | Li | G06Q 30/02 705/14.23 |
| 2013/0006916 | A1* | 1/2013 | McBride | G06Q 30/0601 706/52 |
| 2013/0054698 | A1* | 2/2013 | Lee | G06Q 30/0259 709/204 |
| 2013/0097664 | A1* | 4/2013 | Herz | G06Q 10/10 726/1 |
| 2013/0144715 | A1* | 6/2013 | Kranzley | G06Q 30/0251 705/14.49 |
| 2013/0231974 | A1* | 9/2013 | Harris | G06Q 30/0201 705/7.29 |
| 2014/0129371 | A1* | 5/2014 | Wilson | G06Q 30/02 705/26.7 |
| 2014/0278764 | A1* | 9/2014 | Noyes | G06Q 40/04 705/7.29 |
| 2014/0279196 | A1* | 9/2014 | Wilson | G06Q 30/0631 705/26.7 |
| 2014/0365301 | A1* | 12/2014 | Rappoport | G06Q 30/0253 705/14.51 |
| 2015/0005007 | A1* | 1/2015 | Schewel | G06Q 30/0201 455/456.3 |
| 2015/0100404 | A1* | 4/2015 | Globe | G06Q 30/0631 705/14.27 |
| 2015/0170042 | A1* | 6/2015 | Perkowitz | H04W 4/21 706/11 |
| 2015/0186951 | A1* | 7/2015 | Wilson | G06N 3/063 705/14.66 |
| 2015/0302062 | A1 | 10/2015 | Cheng et al. | |
| 2016/0012343 | A1* | 1/2016 | Flinn | G06N 5/04 706/52 |
| 2016/0117595 | A1 | 4/2016 | Zhang et al. | |
| 2016/0275594 | A1* | 9/2016 | Mullakkara Azhuvath | G06F 16/248 |
| 2016/0358214 | A1* | 12/2016 | Shalunov | G06Q 30/0241 |
| 2017/0031979 | A1* | 2/2017 | Raina | G06F 16/951 |
| 2017/0041762 | A1* | 2/2017 | Colonna | H04W 4/029 |
| 2017/0195854 | A1* | 7/2017 | Shi-Nash | H04W 4/029 |
| 2017/0323295 | A1* | 11/2017 | Kranzley | G06Q 20/387 |
| 2018/0096417 | A1* | 4/2018 | Cook | G06Q 30/0243 |
| 2019/0138553 | A1* | 5/2019 | Maharajh | H04H 60/91 |

FOREIGN PATENT DOCUMENTS

| | | |
|---|---|---|
| CN | 105631531 A | 6/2016 |
| EP | 2620879 A1 | 7/2013 |

OTHER PUBLICATIONS

Innovation Plus Search Query (Generated Feb. 11, 2020).*
International Search Report in PCT/CN2017/114977 dated Feb. 24, 2018, 5 pages.
Written Opinion in PCT/CN2017/114977 dated Feb. 24, 2018, 4 pages.

* cited by examiner ns and methods for determining an affinity between users

CROSS-REFERENCE TO RELATED APPLICATIONS

This application is a continuation of International Application No. PCT/CN2017/114977, filed on Dec. 7, 2017, which claims priority to Chinese Application No. 201710076908.4 filed on Feb. 13, 2017. Each of the above-referenced applications is incorporated herein by reference in its entirety.

TECHNICAL FIELD

The present disclosure generally relates to systems and methods for on-demand services, and in particular, to systems and methods for determining an affinity associated with on-demand services between a target user and at least one candidate user.

BACKGROUND

On-demand services (e.g., a taxi hailing service) utilizing Internet technology have become increasingly popular because of their convenience. For a specific user, a system providing on-demand services may present recommendations (e.g., a possible friend, a travel recommendation) to the user based on the user's location and preference. In some situations, in order to provide appropriate and interesting recommendations, it is desirable to know the level of connection (affinity) between the users. The systems and methods herein disclosed may at least in part be used to determine the affinity between the users.

SUMMARY

According to an aspect of the present disclosure, a system is provided. The system may include at least one storage medium and at least one processor in communication with the at least one storage medium. The at least one storage medium may include a set of instructions for determining an affinity between a target user and at least one candidate user. When the at least one processor executes the set of instructions, the at least one processor may be configured to cause the system to perform one or more of the following operations. The at least one processor may obtain a plurality of target service orders associated with the target user and a plurality of candidate service orders associated with the candidate user within a predetermined time period, wherein each of the plurality of target service orders and the plurality of candidate service orders may include a start location and a start time. The at least one processor may select one or more relevant service orders from the plurality of candidate service orders based on the plurality of target service orders, wherein for each of the one or more relevant service orders, a time difference between the start time of the relevant service order and the start time of one of the plurality of target service orders is less than a time threshold and/or a location difference between the start location of the relevant service order and the start location of one of the plurality of target service orders is less than a location threshold. The at least one processor may determine an affinity between the target user and the candidate user based on the one or more relevant service orders.

According to another aspect of the present disclosure, a method is provided. The method may be implemented on a computing device having at least one processor, at least one storage medium, and a communication platform connected to a network. The method may include one or more of the following operations. The at least one processor may obtain a plurality of target service orders associated with the target user and a plurality of candidate service orders associated with the candidate user within a predetermined time period, wherein each of the plurality of target service orders and the plurality of candidate service orders may include a start location and a start time. The at least one processor may select one or more relevant service orders from the plurality of candidate service orders based on the plurality of target service orders, wherein for each of the one or more relevant service orders, a time difference between the start time of the relevant service order and the start time of one of the plurality of target service orders is less than a time threshold and/or a location difference between the start location of the relevant service order and the start location of one of the plurality of target service orders is less than a location threshold. The at least one processor may determine an affinity between the target user and the candidate user based on the one or more relevant service orders.

According to yet another aspect of the present disclosure, a non-transitory computer-readable storage medium is provided. The non-transitory computer-readable storage medium may include a set of instructions for determining an affinity between a target user and at least one candidate user. When the set of instructions is executed by at least one processor, the set of instructions may direct the at least one processor to perform one or more of the following operations. The at least one processor may obtain a plurality of target service orders associated with the target user and a plurality of candidate service orders associated with the candidate user within a predetermined time period, wherein each of the plurality of target service orders and the plurality of candidate service orders may include a start location and a start time. The at least one processor may select one or more relevant service orders from the plurality of candidate service orders based on the plurality of target service orders, wherein for each of the one or more relevant service orders, a time difference between the start time of the relevant service order and the start time of one of the plurality of target service orders is less than a time threshold and/or a location difference between the start location of the relevant service order and the start location of one of the plurality of target service orders is less than a location threshold. The at least one processor may determine an affinity between the target user and the candidate user based on the one or more relevant service orders.

In some embodiments, for each of the one or more relevant service orders, the at least one processor may determine a first order affinity based on the time difference and the time threshold or a second order affinity based on the location difference and the location threshold. The at least one processor may determine the affinity between the target user and the candidate user based on one or more first order affinities or one or more second order affinities.

In some embodiments, the at least one processor may determine a candidate user set including a plurality of candidate users. The at least one processor may determine a plurality of affinities between the target user and the plurality of candidate users. The at least one processor may determine a sum of the plurality of affinities. The at least one processor may determine a ratio of the affinity of each candidate user to the sum of the plurality of affinities. The at least one processor may obtain a normalization parameter associated with a user level of the target user. The at least one processor may determine a normalized affinity between the target user and each candidate user in the candidate user set based on the ratio and the normalization parameter.

In some embodiments, the at least one processor may determine an average number of service orders per capita for the plurality of candidate users within the predetermined time period. The at least one processor may obtain a number of the plurality of target service orders. The at least one processor may determine the normalization parameter based on the average number of service orders per capita and the number of the plurality of target service orders.

In some embodiments, the at least one processor may determine a relevancy between the target user and the candidate user based on the normalized affinity.

In some embodiments, the at least one processor may obtain target wireless local area network (LAN) connection data associated with the target user. The at least one processor may obtain candidate wireless LAN connection data associated with the candidate user. The at least one processor may determine whether there is wireless LAN interconnection data between the target user and the candidate user based on the target wireless LAN connection data and the candidate wireless LAN connection data, wherein the wireless LAN interconnection data may include the number of times the target user and the candidate user connect to the same wireless LAN. In response to the determination that there is wireless LAN interconnection data between the target user and the candidate user, the at least one processor may increase the affinity between the target user and the candidate user based on the wireless LAN interconnection data.

In some embodiments, the candidate user is a colleague of the target user, a family member of the target user, or has shared a red-packet with the target user.

In some embodiments, the at least one processor may determine whether the candidate user is a colleague of the target user. In response to the determination that the candidate user is a colleague of the target user, the at least one processor may determine a work address associated with the candidate user and the target user. The at least one processor may exclude a first set of service orders from the plurality of target service orders and the plurality of candidate service orders, wherein for each of the first set of service orders, the start location of the service order is associated with the work address.

In some embodiments, the at least one processor may determine whether the candidate user is a family member of the target user. In response to the determination that the candidate is a family member of the target user, the at least one processor may determine a family address associated with the candidate user and the target user. The at least one processor may exclude a second set of service orders from the plurality of target service orders and the plurality of candidate service orders, wherein for each of the second set of service orders, the start location of the service order is associated with the family address.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAIL DESCRIPTION

Figure 1:
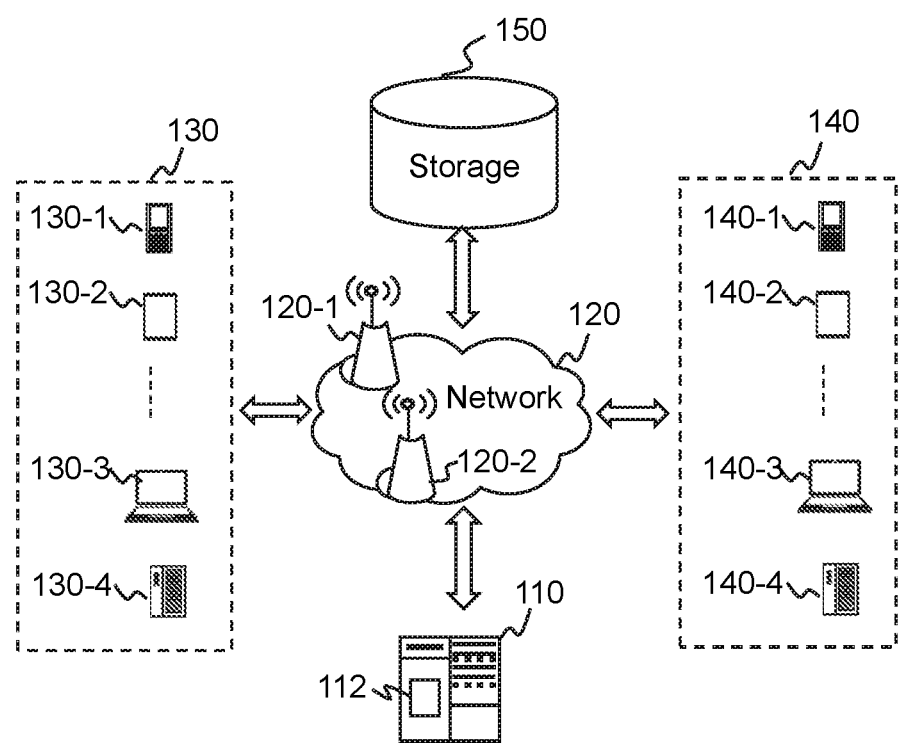
FIG. 1 is a schematic diagram illustrating an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure, and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding on-demand transportation service, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a client terminal, a custom system, an internal analysis system, an artificial intelligence robot, or the like, or any combination thereof.

The terms "passenger," "requestor," "service requestor," and "customer" in the present disclosure are used interchangeably to refer to an individual, an entity that may request or order a service. Also, the terms "driver," "provider," "service provider," and "supplier" in the present disclosure are used interchangeably to refer to an individual, an entity or a tool that may provide a service or facilitate the providing of the service. The term "user" in the present disclosure may refer to an individual, an entity that may request a service, order a service, provide a service, or facilitate the providing of the service. For example, the user may be a passenger, a driver, an operator, or the like, or any combination thereof. In the present disclosure, terms "passenger," "user equipment," "user terminal," and "passenger terminal" may be used interchangeably, and terms "driver" and "driver terminal" may be used interchangeably.

The terms "request," and "service request" in the present disclosure are used interchangeably to refer to a request that may be initiated by a passenger, a requestor, a service requestor, a customer, a driver, a provider, a service provider, a supplier, or the like, or any combination thereof. The service request may be accepted by any one of a passenger, a requestor, a service requestor, a customer, a driver, a provider, a service provider, or a supplier. The service request may be chargeable or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

An aspect of the present disclosure relates to systems and methods for determining an affinity between a target user and at least one candidate user. The systems and methods may determine the affinity based on historical service orders associated with the target user and the candidate user. For example, the systems and methods may obtain a plurality of target service orders associated with the target user and a plurality of candidate service orders associated with the candidate user within a predetermined time period (e.g., last calendar year or in the past 12 months). The systems and methods may further select one or more relevant service orders from the plurality of candidate service orders based on the plurality of target service orders according to a preset condition (e.g., a time threshold, a location threshold). Further, the systems and methods may determine the affinity between the target user and the candidate user based on the one or more relevant service orders.

Further, the systems and methods may determine a plurality of affinities between the target user and a plurality of candidate users. In addition, the systems and methods may establish a relevancy between the target user and the plurality of candidate users based on the plurality of affinities, and provide personalized recommendations for the target user based on the relevancy.

It should be noted that online on-demand transportation service (e.g., online taxi hailing), is a new form of service rooted only in post-Internet era. It provides technical solutions to users (e.g., service requestors) and service providers (e.g., drivers) that could raise only in post-Internet era. In pre-Internet era, when a user hails a taxi on street, the taxi request and acceptance occur only between the passenger and one taxi driver that sees the passenger. If the passenger hails a taxi through a telephone call, the service request and acceptance may occur only between the passenger and one service provider (e.g., one taxi company or agent). Online taxi, however, allows a user of the service to automatically distribute a service request to a vast number of individual service providers (e.g., taxi) in distance away from the user in real time. It also allows a plurality of service providers to respond to the service request simultaneously and in real-time. Therefore, through the Internet, the online on-demand transportation systems may provide a much more efficient transaction platform for the users and the service providers that may never meet in a traditional pre-Internet transportation service system.

FIG. 1 is a schematic diagram illustrating an exemplary on-demand service system 100 according to some embodiments of the present disclosure. For example, the on-demand service system 100 may be an online transportation service platform for transportation services such as taxi hailing, chauffeur services, delivery vehicles, express car, carpool, bus service, driver hiring and shuttle services. The on-demand service system 100 may be an online platform including a server 110, a network 120, a requestor terminal 130, a provider terminal 140, and a storage 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the one or more user terminals (e.g., the one or more requestor terminals 130, provider terminals 140), and/or the storage 150 via the network 120. As another example, the server 110 may be directly connected to the one or more user terminals (e.g., the one or more requestor terminals 130, provider terminals 140), and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions of the server 110 description in the present disclosure. For example, the processing engine 112 may determine an affinity between a target user and a candidate user based on historical service orders associated with the target user and the candidate user. In some embodiments, the processing engine 112 may include one or more processing engines (e.g., signal-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the on-demand service system 110 (e.g., the server 110, the one or more requestor terminals 130, provider terminals 140, or the storage 150) may transmit information and/data to other component(s) of the on-demand service system 100 via the network 120. For example, the server 110 may receive a service request from the requestor terminal 130 via the network 120. In some embodiments, the network 120 may be any type of wired or wireless network, or any combination thereof. Merely by way of example, the network 120 may include a cable network, a wireline network, an optical fiber network, a tele communications network, an intranet, an internet, a local area network (LAN), a wide area network (WAN), a wireless local area network (WLAN), a metropolitan area network (MAN), a wide area network (WAN), a public telephone switched network (PTSN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information between them.

In some embodiments, a service requestor may be a user of the requestor terminal 130. In some embodiments, the user of the requestor terminal 130 may be someone other than the service requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may use the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, the built-in device in the motor vehicle 130-4 may include an onboard computer, an onboard television, etc. In some embodiments, the requestor terminal 130 may be a device with positioning technology for locating the position of the service requestor and/or the requestor terminal 130.

In some embodiments, the provider terminal 140 may be similar to, or the same device as the requestor terminal 130. In some embodiments, the provider terminal 140 may be a device with positioning technology for locating the position of the driver and/or the provider terminal 140. In some embodiments, the requestor terminal 130 and/or the provider terminal 140 may communicate with other positioning device to determine the position of the service requestor, the requestor terminal 130, the driver, and/or the provider terminal 140. In some embodiments, the requestor terminal 130 and/or the provider terminal 140 may send positioning information to the server 110.

The storage 150 may store data and/or instructions. In some embodiments, the storage 150 may store data obtained from the one or more user terminals (e.g., the one or more passenger terminals 130, provider terminals 140). In some embodiments, the storage 150 may store data and/or instructions that the server 110 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the on-demand service system 100 (e.g., the server 110, the requestor terminal 130, the provider terminal 140). One or more components of the on-demand service system 100 may access the data and/or instructions stored in the storage 150 via the network 120. In some embodiments, the storage 150 may be directly connected to or communicate with one or more components of the on-demand service system 100 (e.g., the server 110, the requestor terminal 130, the provider terminal 140). In some embodiments, the storage 150 may be part of the server 110.

In some embodiments, one or more components of the on-demand service system 100 (e.g., the server 110, the requestor terminal 130, the provider terminal 140) may access the storage 150. In some embodiments, one or more components of the on-demand service system 100 may read and/or modify information relating to the service requestor, provider, and/or the public when one or more conditions are met. For example, the server 110 may read and/or modify one or more users' information after a service. As another example, the provider terminal 140 may access information relating to the service requestor when receiving a service request from the requestor terminal 130, but the provider terminal 140 may not modify the relevant information of the service requestor.

In some embodiments, information exchanging of one or more components of the on-demand service system 100 may be achieved by way of requesting a service. The object of the service request may be any product. In some embodiments, the product may be a tangible product, or immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof.

One of ordinary skill in the art would understand that when an element of the on-demand service system 100 performs, the element may perform through electrical signals and/or electromagnetic signals. For example, when a requestor terminal 130 processes a task, such as making a determination, identifying or selecting an object, the requestor terminal 130 may operate logic circuits in its processor to process such task. When the requestor terminal 130 sends out a service request to the server 110, a processor of the service requestor terminal 130 may generate electrical signals encoding the service request. The processor of the requestor terminal 130 may then send the electrical signals to an output port. If the requestor terminal 130 communicates with the server 110 via a wired network, the output port may be physically connected to a cable, which may further transmit the electrical signals to an input port of the server 110. If the requestor terminal 130 communicates with the server 110 via a wireless network, the output port of the requestor terminal 130 may be one or more antennas, which may convert the electrical signals to electromagnetic signals. Similarly, a provider terminal 140 may process a task through operation of logic circuits in its processor, and receive an instruction and/or service request from the server 110 via electrical signals or electromagnet signals. Within an electronic device, such as the requestor terminal 130, the provider terminal 140, and/or the server 110, when a processor thereof processes an instruction, sends out an instruction, and/or performs an action, the instruction and/or action is conducted via electrical signals. For example, when the processor retrieves or saves data from a storage medium (e.g., the storage 150), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
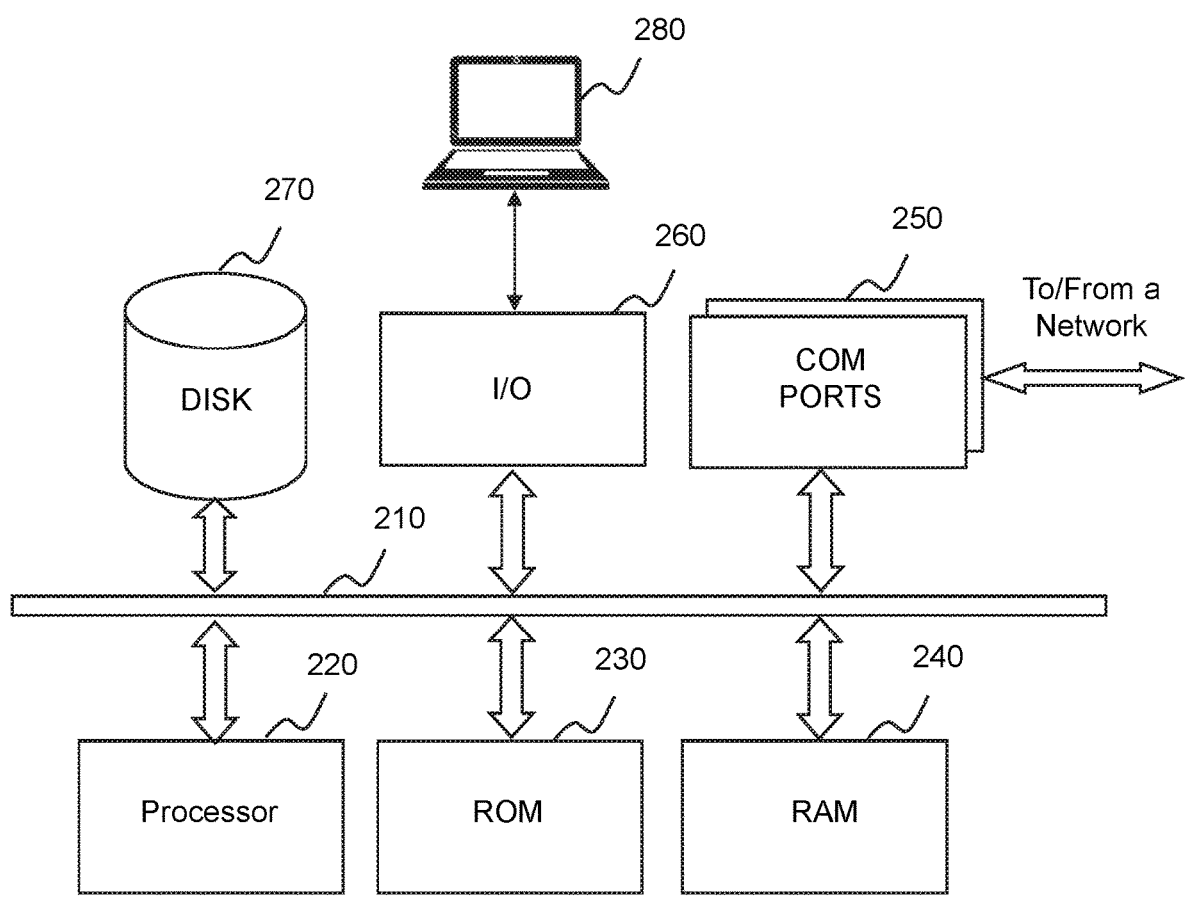
FIG. 2 is a schematic diagram illustrating an exemplary computing device according to some embodiments of the present disclosure.

FIG. 2 is a schematic diagram illustrating exemplary hardware and software components of a computing device 200 on which the server 110, the requestor terminals 130, or the provider terminals 140 may be implemented according to some embodiments of the present disclosure. For example, the processing engine 112 may be implemented on the computing device 200 and configured to perform functions of the processing engine 112 disclosed in this disclosure.

The computing device 200 may be used to implement any component of the on-demand service system 100 as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may include an internal communication bus 210, program storage and data storage of different forms including, for example, a disk 270, and a read only memory (ROM) 230, or a random access memory (RAM) 240, for various data files to be processed and/or transmitted by the computing device. The exemplary computer platform may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

Merely for illustration, only one processor is described in FIG. 2. Multiple processors are also contemplated, thus operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
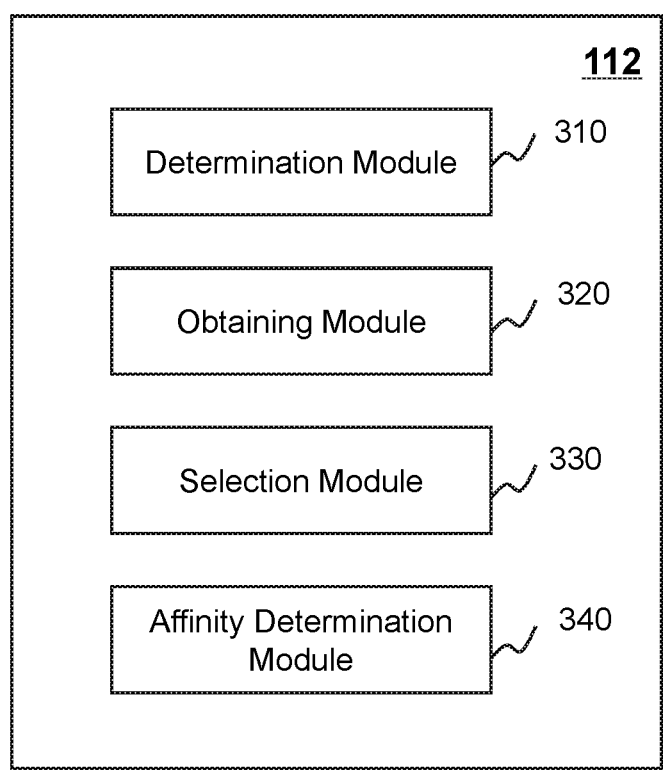
FIG. 3 is a block diagram illustrating an exemplary processing engine according to some embodiments of the present disclosure.

FIG. 3 is a block diagram illustrating an exemplary processing engine 112 according to some embodiments of the present disclosure. The processing engine 112 may include a determination module 310, an obtaining module 320, a selection module 330, and an affinity determination module 340.

The determination module 310 may be configured to determine a target user and a candidate user associated with the target user. In some embodiments, the target user may be a person that the system 100 intends to provide personalized recommendations to. The candidate user may be any person that have a direct or indirect relationship with the target user in any capacity. In some embodiments, the candidate user may be a colleague of the target user, a family member of the target user, or a user who has shared a red-packet with the target user. In some embodiments, the candidate user may include a user located in a same region (e.g., a same province, a same city, a same district, a same community, a same building, a same address) with the target user, a user in a same age range (e.g., an age range from 25 to 35) as the target user, a user with a different gender as the target user, a user with a same gender as the target use, a user with a similar occupation with the target user, or the like, or a combination thereof. In some embodiments, the determination module 310 may determine whether the candidate user sends/receives a red-packet to/from the target user. In some online services (e.g., online taxi hailing service), the users can send/receive money to/from one another—such actions are referred to as "red-packet sharing", which is also considered one type of relationship that can be used to determine whether a user is a candidate user associated with the target user.

The obtaining module 320 may be configured to obtain a plurality of target service orders associated with the target user and a plurality of candidate service orders associated with the candidate user within a predetermined time period (e.g., last week, last month, last year, etc.). The obtaining module 320 may obtain the plurality of target service orders and the plurality of candidate service orders from the storage 150 or any storage device disclosed elsewhere in the present disclosure. In some embodiments, each of the plurality of target service orders and the plurality of candidate service orders may be an order for a transportation service (e.g., a taxi hailing service) and include a start time, a start location, a destination, etc.

In some embodiments, the obtaining module 320 may further determine whether the candidate user is a colleague of the target user. Here, the term "colleague" refers to a person that works or studies in a same company, institution, school, or entity as the target user. Therefore, in some embodiments, the candidate user who is a colleague of the target user shares a same work or study location (referred to as "work address" here) with the target user. In some embodiments, in response to the determination that the candidate user is a colleague of the target user, the obtaining module 320 may exclude a first set of service orders from the plurality of target service orders and the plurality of candidate service orders, wherein for each of the first set of service orders, the start location of the service order is associated with a work address associated with the candidate user and the target user.

In some embodiments, the obtaining module 320 may further determine whether the candidate user is a family member of the target user. Here, the term "family member" broadly refers to any person that has a familial (e.g., spouse, parent, or child) or residential (e.g., roommate or housemate) relationship with the target user. In some embodiments, the family member shares a same residential location (referred to as "family address) as the target user. In certain embodiments, in response to the determination that the candidate user is a family member of the target user, the obtaining module 320 may exclude a second set of service orders from the plurality of target service orders and the plurality of candidate service orders, wherein for each of the second set of service orders, the start location of the service order is associated with a family address associated with the candidate user and the target user.

The selection module 330 may be configured to select one or more relevant service orders from the plurality of candidate service orders based on the plurality of target service orders according to a preset condition (e.g., a time threshold, a location threshold). For example, for each of the one or more relevant service orders, a time difference between the start time of the relevant service order and the start time of one of the plurality of target service orders is less than the time threshold (e.g., 10 minutes) and/or a location difference between the start location of the relevant service order and the start location of one of the plurality of target service orders is less than the location threshold (e.g., 100 meters).

The affinity determination module 340 may be configured to determine an affinity between the target user and the candidate user. In some embodiments, the affinity determination module 340 may determine the affinity between the target user and the candidate user based on the one or more relevant service orders. For example, the affinity determination module 340 may determine the affinity between the target user and the candidate user based on a number of the one or more relevant service orders, the time difference(s) and/or the location difference(s) associated with the one or more relevant service orders, etc.

The modules in the processing engine 112 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the determination module 310 and the obtaining module 320 may be combined as a single module which may both determine a target user and a candidate user and obtain service orders associated with the target user and the candidate user. As another example, the selection module 330 and the affinity determination module 340 may be combined as a single module which may both select the relevant service order(s) and determine the affinity based on the relevant service order(s). As a further example, the processing engine 112 may include a storage module (not shown) used to store information and/or data (e.g., the target service orders, the candidate service orders, the affinity, etc.) associated with the target user and the candidate user.

Figure 4:
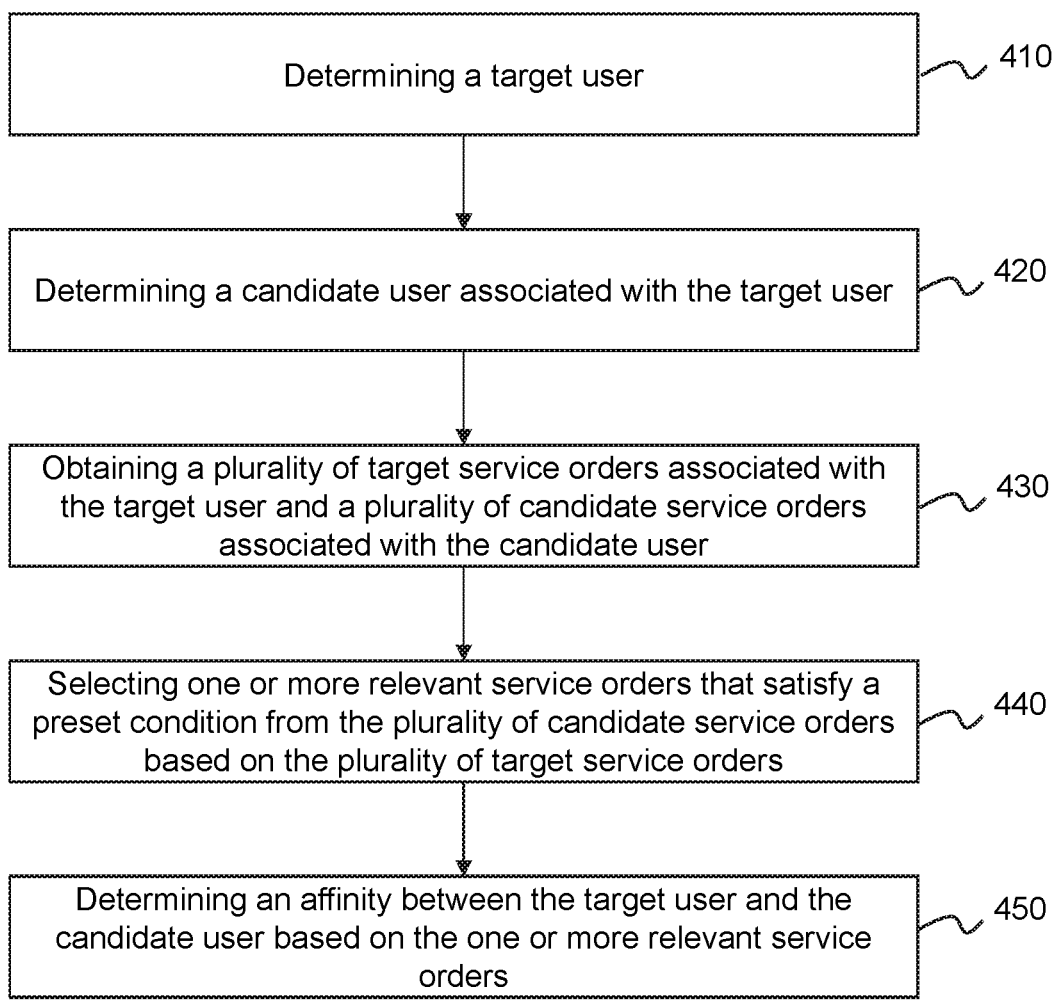
FIG. 4 is a flowchart illustrating an exemplary process for determining an affinity between a target user and a candidate user according to some embodiments of the present disclosure.

FIG. 4 is a flowchart illustrating an exemplary process 400 for determining an affinity between a target user and a candidate user according to some embodiments of the present disclosure. In some embodiments, the process 400 may be implemented as a set of instructions (e.g., an application) stored in the storage ROM 230 or RAM 240. The processor 220 may execute the set of instructions, and when executing the instructions, it may be configured to perform the process 400. The operations of the illustrated process presented below are intended to be illustrative. In some embodiments, the process 400 may be accomplished with one or more additional operations not described and/or without one or more of the operations herein discussed. Additionally, the order in which the operations of the process as illustrated in FIG. 4 and described below is not intended to be limiting.

In step 410, the processing engine 112 (e.g., the determination module 310) (e.g., the processing circuits of the processor 220) may determine a target user. In some embodiments, the target user may be a person that the system 100 intends to provide personalized recommendations to.

In step 420, the processing engine 112 (e.g., the determination module 310) (e.g., the processing circuits of the processor 220) may determine a candidate user associated with the target user. In some embodiments, the candidate user may include a colleague of the target user, a family member of the target user, or a user who has shared a red-packet with the target user. In some embodiments, the candidate user may include a user located in a same region (e.g., a same province, a same city, a same district, a same community, a same building, or a same address) with the target user, a user with a same age range (e.g., a age range from 25 to 35) with the target user, a user with a different gender with the target user, a user with a similar occupation with the target user, or the like, or a combination thereof.

In step 430, the processing engine 112 (e.g., the obtaining module 320) (e.g., the processing circuits of the processor 220) may obtain a plurality of target service orders associated with the target user and a plurality of candidate service orders associated with the candidate user within a predetermined time period (e.g., last week, last month, last year, etc.). The processing engine 112 may obtain the plurality of target service orders and the plurality of candidate service orders from the storage 150 or any storage device disclosed elsewhere in the present disclosure.

In some embodiments, each of the plurality of target service orders and the plurality of candidate orders may be an order for a transportation service (e.g., a taxi hailing service). The transportation service order may include a start time, a start location, a destination, etc. As used herein, the start time refers to a time point when the requestor wishes to start using the transportation service; the start location refers to a location where the requestor (or a person for whom the requestor is making the request) wishes to be picked up by a service provider, and the destination refers to a location where the requestor wished to be dropped off by the service provider. In some embodiments, each of the plurality of the target service orders and the plurality of candidate service orders may also include travel information (e.g., a travel route from the start location to the destination), traffic information, user information (e.g., user name, user ID, gender, age), etc.

In some embodiments, the processing engine 112 may further determine whether the candidate user is a colleague of the target user. In response to the determination that the candidate user is a colleague of the target user, the processing engine 112 may determine a work address associated with the candidate user and the target user. Further, the processing engine 112 may exclude a first set of service orders from the plurality of target service orders and the plurality of candidate service orders, wherein for each of the first set of service orders, the start location of the service order is associated with the work address.

In some embodiments, the processing engine 112 may further determine whether the candidate user is a family member of the target user. In response to the determination that the candidate user is a family member of the target user, the processing engine 112 may determine a family address associated with the candidate user and the target user. Further, the processing engine 112 may exclude a second set of service orders from the plurality of target service orders and the plurality of candidate service orders, wherein for each of the second set of service orders, the start location of the service order is associated with the family address.

In step 440, the processing engine 112 (e.g., the selection module 330) (e.g., the processing circuits of the processor 220) may select one or more relevant service orders from the plurality of candidate service orders based on the plurality of target service orders. The processing engine 112 may select the one or more relevant service orders according to a preset condition (e.g., a time threshold, a location threshold). For example, for each of the one or more relevant service orders, a time difference between the start time of the relevant service order and the start time of one of the plurality of target service orders is less than the time threshold and/or a location difference between the start location of the relevant service order and the start location of one of the plurality of target service orders is less than the location threshold. In some embodiments, the "one of the plurality of target service orders" that is being compared to the relevant service order is the target service order that provides the closest parameter (e.g., start time and/or start location). In certain embodiments, it is required that the target service order that has the start time difference less than the time threshold must be the same target service order that has the start location difference less than the location threshold—only if such a target service order is found can a candidate service order be considered a relevant service order. In certain embodiments, it is only required that one of the conditions (starting time or starting location) is satisfied.

As used herein, the time threshold and/or the location threshold may be default settings of the system 100, or may be adjustable under different situations. For example, the time threshold may be 10 minutes, 15 minutes, 20 minutes, 30 minutes, 1 hour, etc. The location threshold may be 30 meters, 50 meters, 80 meters, 100 meters, 300 meters, 500 meters, 1000 meters, etc.

In some embodiments, the time threshold and/or the location threshold may be changed to alter the number of relevant service orders. For example, when low thresholds (e.g., 10 minutes and 50 meters) result in zero relevant service orders, the thresholds may be increased (e.g., 30 minutes and 300 meters) to obtain more relevant service orders. In some embodiments, the thresholds may be incrementally adjusted so that the number of relevant service order is not zero, or so that the number of relevant service order is equal to or more than a preset minimum number (e.g., 1, 5, 10, or 20, etc.). In some embodiments, the thresholds may be incrementally adjusted so that the number of relevant service order is equal to or less than a preset maximum number (e.g., 1, 5, 10, or 20, etc.).

In step 450, the processing engine 112 (e.g., the affinity determination module 340) (e.g., the processing circuits of the processor 220) may determine an affinity between the target user and the candidate user based on the one or more relevant service orders. For example, the processing engine 112 may determine the affinity between the target user and the candidate user based on a number of the one or more relevant service orders, time difference(s) and/or location difference(s) associated with the one or more relevant service orders, etc. The larger the number of the one or more relevant service orders is, the larger the affinity between the target user and the candidate user may be. The smaller the time difference(s) and/or the location difference(s) are, the larger the affinity between the target user and the candidate user may be.

In some situations, in step 440, there may be no service orders that satisfy the preset condition (i.e., the number of the relevant service order(s) is zero), the processing engine 112 may determine the affinity between the target user and the candidate user as zero. In some embodiments, as indicated above, the processing engine 112 may alter the number of relevant service orders by adjusting the thresholds, thus affecting the determination of affinity in step 450.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 400. In the storing step, the processing engine 112 may store information and/or data (e.g., the target service orders, the candidate service orders, the affinity, etc.) associated with the target user and the candidate user in a storage device (e.g., the storage 150) disclosed elsewhere in the present disclosure.

Figure 5:
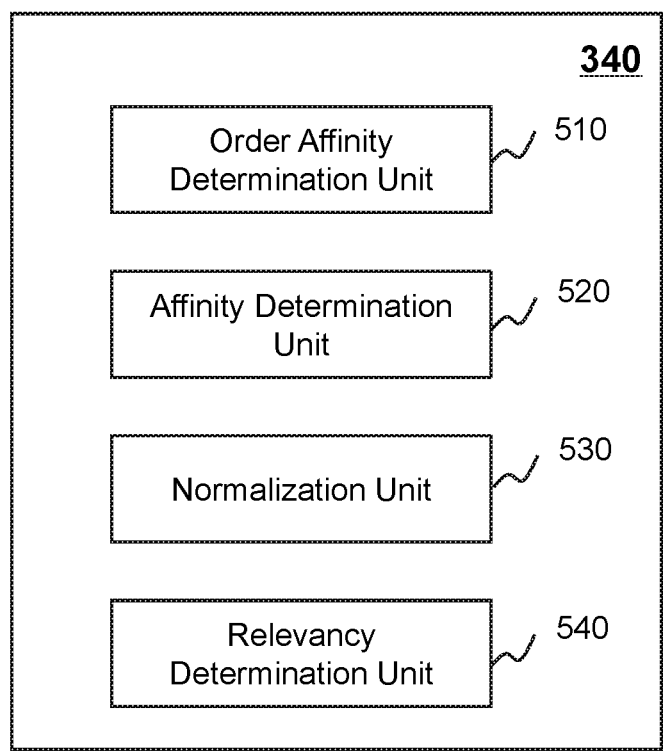
FIG. 5 is a block diagram illustrating an exemplary affinity determination module according to some embodiments of the present disclosure.

FIG. 5 is a block diagram illustrating an exemplary affinity determination module 340 according to some embodiments of the present disclosure. The affinity determination module 340 may include an order affinity determination unit 510, an affinity determination unit 520, a normalization unit 520, and a relevancy determination unit 540.

The order affinity determination unit 510 may be configured to determine one or more order affinities based on one or more differences associated with the one or more relevant service orders and the plurality of target service orders. Take a specific relevant service order as an example, the order affinity determination unit 510 may determine a time difference between the start time of the specific relevant service order and the start time of a corresponding target service order. In some embodiments, the corresponding target service order refers to the target service order that has the closest start time to the specific relevant service order. In some embodiments, the corresponding target service order refers to the target service order that has a start time difference (compared to the specific relevant service order) that is less than the time threshold and a start location difference (compared to the specific relevant service order) that is less than the location threshold.

The order affinity determination unit 510 may also determine a location difference between the start location of the specific relevant service order and the start location of the corresponding target service order. In some embodiments, the corresponding target service order refers to the target service order that has the closest start location to the specific relevant service order. In some embodiments, the corresponding target service order refers to the target service order that has a start time difference (compared to the specific relevant service order) that is less than the time threshold and a start location difference (compared to the specific relevant service order) that is less than the location threshold.

The order affinity determination unit 510 may determine the order affinity between the specific relevant service order and the corresponding target service order based on the time difference and/or the location difference.

The affinity determination unit 520 may be configured to determine an affinity between the target user and the candidate user based on one or more order affinities associated with the one or more relevant service orders. The affinity determination unit 520 may determine the affinity between the target user and the candidate user based on a processing result (e.g., a sum, an average, a weighted sum, etc.) of the one or more order affinities.

The normalization unit 530 may be configured to determine a normalized affinity between the target user and the candidate user. The normalization unit 530 may determine a candidate user set including a plurality of candidate users and determine a plurality of affinities between the target user and the plurality of candidate users. The normalization unit 530 may determine a normalization parameter associated with a user level of the target user based on a number of the plurality of target service orders associated with the target user (e.g., see, formula (10) and the description thereof). In certain embodiments, the user level reflects a historical level that the user utilizes the service. In certain embodiments, the user level reflects a service level (e.g., premier class, normal class, etc.) the user chooses to associate himself/herself with the service. For a specific candidate user, the normalization unit 530 may determine the normalized affinity between the target user and the specific candidate user based on a ratio of the affinity of the specific candidate user to a sum of the plurality of affinities and the normalization parameter (e.g., see, formula (11) or formula (12) and the description thereof).

The relevancy determination unit 540 may be configured to determine a relevancy associated with the target user and each candidate user in the candidate user set. The relevancy may indicate a social relationship between the target user and the plurality of candidate users in the candidate user set. The relevancy determination unit 540 may provide a personalized recommendation (e.g., an Internet product (e.g., an application), a travel recommendation, a possible friend) for the target user based on the relevancy. Further, the relevancy determination unit 540 may provide a user interface via which the target user may share information (e.g., travel information) with the plurality of candidate users. In some embodiments, the processing engine 112 may generate a recommendation for the target user based on the preferences of a candidate user that has a high relevancy with the target user.

In some embodiments, the affinity determination module 340 may further include an interconnection data determination unit (not shown) which may be configured to determine whether there is wireless local area network (LAN) interconnection data between the target user and the candidate user based on target wireless LAN connection data associated with the target user and candidate wireless LAN connection data associated with the candidate user. The wireless LAN interconnection data may include a number of times the target user and the candidate user connect to the same wireless LAN. In response to the determination that there is the wireless LAN interconnection data between the target user and the candidate user, the processing engine 112 may increase the affinity between the target user and the candidate user based on the wireless LAN interconnection data.

The units in the affinity determination module 340 may be connected to or communicate with each other via a wired connection or wireless connection. The wired connection may include metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the units may be combined into a single module, and any one of the units may be divided into two of more sub-units. For example, the order affinity determination unit 510 and the affinity determination unit may be combined as a single unit which may both determine the order affinity and the affinity between the target user and the candidate user. As another example, the normalization unit 530 and/or the relevancy determination unit 540 may be integrated in the affinity determination unit 520. As a further example, the normalization unit 530 and/or the relevancy determination unit 540 may be independent modules in the processing engine 112.

Figure 6:
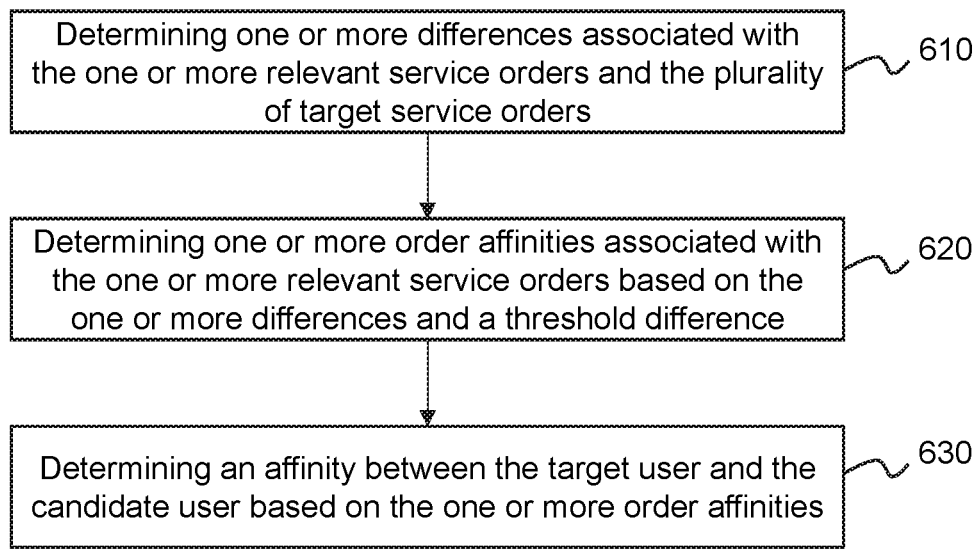
FIG. 6 is a flowchart illustrating an exemplary process for determining an affinity between a target user and a candidate user according to some embodiments of the present disclosure.

FIG. 6 is a flowchart illustrating an exemplary process 600 for determining an affinity between a target user and a candidate user according to some embodiments of the present disclosure. The process 600 may be implemented as a set of instructions (e.g., an application) stored in the storage ROM 230 or RAM 240. The processor 220 may execute the set of instructions, and when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In step 610, the processing engine 112 (e.g., the order affinity determination unit 510 or the selection module 330) (e.g., the processing circuits of the processor 220) may determine one or more differences associated with the one or more relevant service orders and the plurality of target service orders. As described in connection with step 440, for each of the one or more relevant service orders, a time difference between the start time of the relevant service order and the start time of one of the plurality of target service orders is less than the time threshold and/or a location difference between the start location of the relevant service order and the start location of one of the plurality of target service orders is less than the location threshold.

Take a specific relevant service order as an example, the processing engine 112 may determine the time difference between the specific relevant service order and a corresponding target service order according to formula (1) below:

$$\text{timeDistance}_i = |\text{st(relevant)}_i - \text{st(target)}_i| \quad (1)$$

where $\text{timeDistance}_i$ refers to the time difference between the start time of the specific relevant service order i and the start time of the corresponding target service order i, $\text{st(relevant)}_i$ refers to the start time of the specific relevant service order i, $\text{st(target)}_i$ refers to the start time of the corresponding target service order i, and i≤n (n refers to the number of the one or more relevant service orders). In some embodiments, the corresponding target service order refers to the target service order that has the closest start time to the specific relevant service order. In some embodiments, the corresponding target service order refers to the target service order that has a start time difference (compared to the specific relevant service order) that is less than the time threshold and a start location difference (compared to the specific relevant service order) that is less than the location threshold.

Also take the specific relevant service order as an example, the processing engine 112 may determine the location difference between the specific relevant service order and the corresponding target service order according to formula (2) below:

$$\text{locationDistance}_i = |\text{sl(relevant)}_i - \text{sl(target)}_i| \quad (2)$$

where $\text{locationDistance}_i$ refers to the location difference between the start location of the specific relevant service order i and the start location of the corresponding target service order i, $\text{sl(relevant)}_i$ refers to the start location of the specific relevant service order i, and $\text{sl(target)}_i$ refers to the start location of the corresponding target service order i. In some embodiments, the corresponding target service order refers to the target service order that has the closest start location to the specific relevant service order. In some embodiments, the corresponding target service order refers to the target service order that has a start time difference (compared to the specific relevant service order) that is less than the time threshold and a start location difference (compared to the specific relevant service order) that is less than the location threshold.

In some embodiments, the processing engine 112 may determine the location difference according to geographic information of the start locations of the relevant service order and the corresponding target service order according to formula (3) below:

$$\text{locationDistance}_i = \sqrt{(x_i - p_i)^2 + (y_i - q_i)^2} \quad (3)$$

where $x_i$ and $y_i$ refer to a longitude coordinate and a latitude coordinate of the start location of the specific relevant service order i, and $p_i$ and $q_i$ refer to a longitude coordinate and a latitude coordinate of the start location of the corresponding target service order i.

In step 620, the processing engine 112 (e.g., the order affinity determination unit 510) (e.g., the processing circuits of the processor 220) may determine one or more order affinities associated with the one or more relevant service orders based on the one or more differences and a threshold difference (e.g., the time threshold, the location threshold).

For example, as described in connection with formula (1) above, the processing engine 112 may determine an order affinity between the specific relevant service order and the corresponding target service order according to formula (4) below:

$$\text{order affinity}(T)_i = \frac{T - timeDistance_i}{T} \quad (4)$$

where order affinity$(T)_i$ refers to a first order affinity between the specific relevant service order i and the corresponding target service order i, and T refers to the time threshold.

As another example, as described in connection with formula (2) or formula (3), the processing engine 112 may determine an order affinity between the specific relevant service order and the corresponding target service order according to formula (5) below:

$$\text{order affinity}(L)_i = \frac{L - locationDistance_i}{L} \quad (5)$$

where order affinity$(L)_i$ refers to a second order affinity between the specific relevant service order i and the corresponding target service order i, and L refers to the location threshold.

In some embodiments, the relevant service orders are selected based on both the start location and the start time. In certain embodiments, the processing engine 112 may determine the order affinity between the specific relevant service order and the corresponding target service order by taking both the start location and start time into consideration. For example, the order affinity in some embodiments may be calculated by adding the order affinity$(T)_i$ and the order affinity$(L)_i$. In certain embodiments, the order affinity may be calculated by assigning weights to the order affinity $(T)_i$ and the order affinity$(L)_i$ and adding the weighted results.

In step 630, the processing engine 112 (e.g., the affinity determination unit 520) (e.g., the processing circuits of the processor 220) may determine an affinity between the target user and the candidate user based on the one or more order affinities. The processing engine 112 may determine the affinity between the target user and the candidate user based on a processed result (e.g., a sum, an average, a weighted sum, etc.) of the one or more order affinities.

For example, the processing engine 112 may determine the affinity between the target user and the candidate user based on the one or more first order affinities according to formula (6) below:

$$\text{affinity}(T) = \text{sum}(\text{order affinity}(T)_i) \times 2^n \quad (6)$$

where affinity(T) refers to a first affinity between the target user and the candidate user.

As another example, the processing engine 112 may determine the affinity between the target user and the candidate user based on the one or more second order affinities according to formula (7) below:

$$\text{affinity}(L) = \text{sum}(\text{order affinity}(L)_L) \times 2^n \quad (7)$$

where affinity(L) refers to a second affinity between the target user and the candidate user.

As another example, the processing engine 112 may determine the affinity between the target user and the candidate user based on the order affinity that takes into consideration both the order affinity$(T)_i$ and the order affinity$(L)_i$.

In some embodiments, the processing engine 112 may further obtain target wireless local area network (LAN) connection data associated with the target user and candidate wireless LAN connection data associated with the candidate user, and modify the affinity between the target user and the candidate user based on the target wireless LAN connection data and candidate wireless LAN connection data. For example, the processing engine 112 may determine whether there is wireless LAN interconnection data between the target user and the candidate user based on the target wireless LAN connection data and candidate wireless LAN connection data. The wireless LAN interconnection data may include a number of times the target user and the candidate user connect to the same wireless LAN.

In response to the determination that there is the wireless LAN interconnection data between the target user and the candidate user, the processing engine 112 may increase the affinity between the target user and the candidate user based on the wireless LAN interconnection data. For example, the processing engine 112 may add a first modification value to the affinity or multiply the affinity by a second modification value based on the number of times the target user and the candidate user connect to the same wireless LAN. The larger the number of times the target user and the candidate user connect to the same wireless LAN is, the larger the first modification value or the second modification value may be.

For illustration purposes, the present disclosure describes the location difference between the start location of the relevant service order and the start location of the target service order as an example, it should be noted that the processing engine 112 may determine a destination difference between the destination of the relevant service order and the destination of the target service order, a route difference between the route of the relevant service order and the route of the target service order, etc. The processing engine 112 may further determine the affinity between the target user and the candidate user based on the destination difference, the route difference, etc.

It should be noted that the above description for determining an affinity between the target user and the candidate user merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
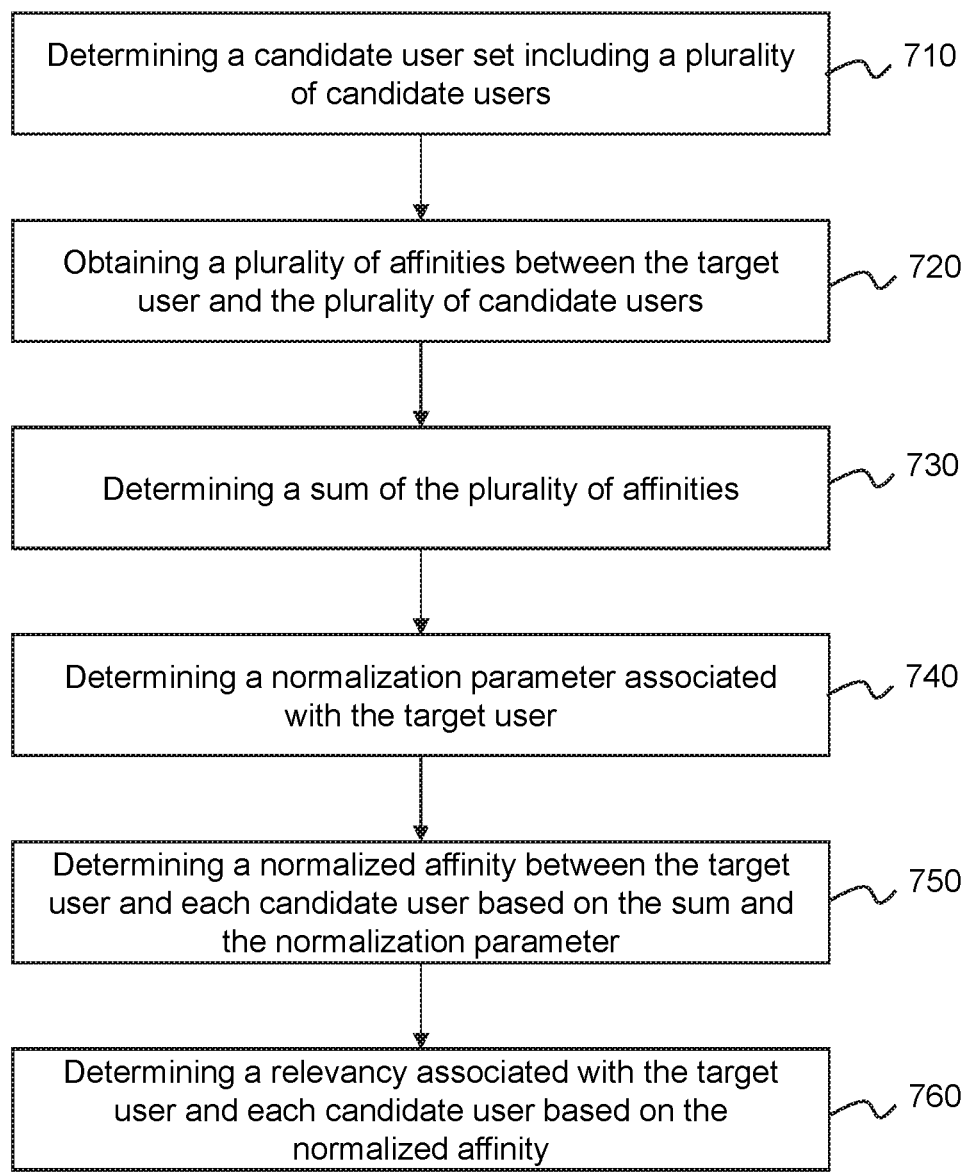
FIG. 7 is a flowchart illustrating an exemplary process for determining a relevancy associated with a target user and a plurality of candidate users according to some embodiments of the present disclosure.

FIG. 7 is a flowchart illustrating an exemplary process 700 for determining a relevancy associated with a target user and a plurality of candidate users according to some embodiments of the present disclosure. The process 700 may be implemented as a set of instructions (e.g., an application) stored in the storage ROM 230 or RAM 240. The processor 220 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In step 710, the processing engine 112 (e.g., the determination module 310) (e.g., the processing circuits of the processor 220) may determine a candidate user set including a plurality of candidate users. In some embodiments, the candidate user set may include users that have the same relationship (e.g., family, colleague, or red-packet sharing) with the target user. In some embodiments, the candidate user set may include users that have different relationships with the target user.

In step 720, the processing engine 112 (e.g., the normalization unit 530) (e.g., the processing circuits of the processor 220) may obtain a plurality of affinities between the target user and the plurality of candidate users. As described in connection with step 450 or step 630, for each of the plurality of candidate users, the processing engine 112 may determine an affinity between the candidate user and the target user as described above, or more specifically according to formula (6) or formula (7).

In step 730, the processing engine 112 (e.g., the normalization unit 530) (e.g., the processing circuits of the processor 220) may determine a sum of the plurality of affinities according to formula (8) or formula (9) below:

$$\text{sum}(T) = \text{affinity}(T)_1 + \text{affinity}(T)_2 + \ldots + \text{affinity}(T)_j \quad (8)$$

where sum(T) refers to a first sum of the plurality of affinities, affinity(T)$_j$ refers to a first affinity between the target user and a candidate user j in the candidate user set, and j≤m (m is a number of the plurality of candidate users in the candidate user set).

$$\text{sum}(L) = \text{affinity}(L)_1 + \text{affinity}(L)_2 + \ldots + \text{affinity}(L)_j \quad (9)$$

where sum(L) refers to a second sum of the plurality of affinities and affinity(L)$_j$ refers to a second affinity between the target user and the candidate user j in the candidate user set.

In step 740, the processing engine 112 (e.g., the normalization unit 530) (e.g., the processing circuits of the processor 220) may determine a normalization parameter associated with a user level of the target user. The processing engine 112 may determine the normalization parameter based on a number of the plurality of target service orders associated with the target user.

For example, the processing engine 112 may determine the normalization parameter according to formula (10) below:

$$\alpha = \frac{u}{v} \quad (10)$$

where α refers to the normalization parameter, u refers to the number of the plurality of target service orders associated with the target user, and v refers to an average number of service orders per capita for the plurality of candidate users in the candidate user set within a predetermined time period (e.g., last week, last month, last year).

In some embodiments, the processing engine 112 may determine an average number of service orders per capita for a plurality of users (e.g., 1000, 2000, 5000, 20000) who have registered the system 100 within a predetermined time period (e.g., last week or the past 7 days, last month or the past 30 days, last year or the past 12 months). Further, the processing engine 112 may determine the normalization parameter based on the number of the plurality of target service orders associated with the target user and the average number of service orders per capita for the plurality of users according to formula (10).

In step 750, the processing engine 112 (e.g., the normalization unit 530) (e.g., the processing circuits of the processor 220) may determine a normalized affinity between the target user and each candidate user based on the sum of the plurality of affinities and the normalization parameter.

Take a specific candidate user as an example, the processing engine 112 may determine the normalized affinity according to formula (11) below:

$$\text{normalized affinity}(T)_j = \frac{\text{affinity}(T)_j}{\text{sum}(T)} \times \alpha \quad (11)$$

where normalized affinity(T)$_j$ refers to a first normalized affinity between the target user and the candidate user j in the candidate set, and α refers to the normalization parameter.

As another example, the processing engine 112 may determine the normalized affinity according to formula (12) below:

$$\text{normalized affinity}(L)_j = \frac{\text{affinity}(L)_j}{\text{sum}(L)} \times \alpha \quad (12)$$

where normalized affinity(L)$_j$ refers to a second normalized affinity between the target user and the candidate user j in the candidate set.

In step 760, in some embodiments, the processing engine 112 (e.g., the relevancy determination unit 540) (e.g., the processing circuits of the processor 220) may determine a relevancy associated with the target user and each candidate user in the candidate user set based on the normalized affinity. In some embodiments, the relevancy may indicate a social relationship between the target user and the plurality of candidate users in the candidate user set. In some embodiments, the processing engine 112 may provide a personalized recommendation (e.g., an Internet product (e.g., an application), a travel recommendation, a possible friend) tailored for the target user based on the relevancy. Further, the processing engine 112 may provide a user interface via which the target user may share information (e.g., travel information) with the plurality of candidate users. In some embodiments, the processing engine 112 may generate a recommendation for the target user based on the preferences of a candidate user that has a high relevancy with the target user.

For illustration purposes, a particular example is provided below. It should be noted that the description below is only provided for illustration, and not intended to limit the scope of the present disclosure.

Assuming that the processing engine 112 determines a target user A and three candidate users including B, C, and D. The candidate user B is a colleague of the target user A, the candidate user C is a family member of the target user A, and the candidate user D is a user who has shared a red-packet with the target user A.

The processing engine 112 may obtain target service orders associated with the target user A within a predetermined time period (e.g., last month) and user information of the target user A illustrated below:

$A_1$: 2016/10/14 12:00:00 116.2887, 40.0433 (Digital Valley);
$A_2$: 2016/10/16 12:00:00 116.3020, 40.0436 (Xiaoxiang House);
$A_3$: 2016/10/17 12:00:00 116.3020, 40.0436 (Xiaoxiang House);
$A_4$: 2016/10/18 12:00:00 116.3020, 40.0436 (Xiaoxiang House);
$A_5$: 2016/10/19 12:00:00 116.3141, 40.0334 (Shangdidongli).
Company address: 116.2887, 40.0433 (Digital Valley);
Family address: 116.3141, 40.0334 (Shangdidongli).

The processing engine 112 may obtain candidate service orders associated with the candidate user B within the predetermined time period (e.g., last month) and user information of the candidate user B illustrated below:

$B_1$: 2016/10/14 12:05:00 116.2887, 40.0433 (Digital Valley);
$B_2$: 2016/10/18 11:55:00 116.3020, 40.0436 (Xiaoxiang House).
Company address: 116.2887, 40.0433 (Digital Valley).

Further, candidate service orders associated with the candidate user C within the predetermined time period (e.g., last month) and user information of the candidate user C are illustrated below:

$C_1$: 2016/10/18 12:02:00 116.3020, 40.0436 (Xiaoxiang House);
$C_2$: 2016/10/19 12:01:00 116.3141, 40.0334 (Shangdidongli);
$C_3$: 2016/10/20 11:01:00 116.3141, 40.0334 (Shangdidongli).
Family address: 116.3141, 40.0334 (Shangdidongli).

Still further, candidate service orders associated with the candidate user D within the predetermined time period (e.g., last month) are illustrated below:

$D_1$: 2016/10/18 12:10:00 116.3020, 40.0436 (Xiaoxiang House);
$D_2$: 2016/10/19 12:10:00 116.3020, 40.0436 (Xiaoxiang House).

Further, the processing engine 112 determines that the candidate user D and the target user A have connected to a same wireless LAN.

For the candidate user B, because he/she is a colleague of the target user A, the processing engine 112 may exclude the target service order $A_1$ and the candidate service order $B_1$ which are associated with the company address "Digital Valley". Then the processing engine 112 may select a relevant service order $B_2$ according to a time threshold "10 minutes" and a location threshold "50 meters" and determine an order affinity between the relevant service order $B_2$ and the target service order $A_4$ according to formula (5). Further, the processing engine 112 may determine an affinity between the target user A and the candidate user B according to formula (7).

For the candidate user C, because he/she is a family member of the target user A, the processing engine 112 may exclude the target service order $A_5$ and the candidate service orders $C_2$ and $C_3$ which are associated with the family address "Shangdidongli". Then the processing engine 112 may select a relevant service order $C_1$ according to the time threshold "10 minutes" and the location threshold "50 meters" and determine an order affinity between the relevant service order $C_1$ and the target service order $A_4$ according to formula (5). Further, the processing engine 112 may determine an affinity between the target user A and the candidate user C according to formula (7).

For the candidate user $D_1$ the processing engine 112 may select a relevant service order $D_1$ according to the time threshold "10 minutes" and the location threshold "50 meters" and determine an order affinity between the relevant service order $D_1$ and the target service order $A_4$ according to formula (5). The processing engine 112 may further determine an affinity between the target user A and the candidate user D according to formula (7). Further, because the target user A and the candidate user D have connected to a same wireless LAN, the processing engine 112 may add a modification value (e.g., 1) to the affinity between the target user A and the candidate user D.

The affinities between the target user A and the candidate users including B, C, and D are illustrated in table 1 below:

TABLE 1 the affinities between the target user A and
the candidate users including B, C, and D

| Candidate user | Affinity |
| --- | --- |
| B | 2 |
| C | 2 |
| D | 3 |

Further, the processing engine 112 may determine normalized affinities between the target user A and the candidate users including B, C, and D. Assuming that the average number of service orders per capita for a plurality of users within the predetermined time period (e.g., last month) is 5, therefore, according to formula (10), the normalization parameters is 1. Then the processing engine 112 may determine the normalized affinities based on the normalization parameter according to formula (12).

The normalized affinities between the target user A and the candidate users including B, C, and D are illustrated in table 2 below:

TABLE 2 normalized affinities between the target user A and
the candidate users including B, C, and D

| Candidate user | Normalized Affinity |
| --- | --- |
| B | 2/7 |
| C | 2/7 |
| D | 3/7 |

With the normalized affinities, the processing engine 112 may determine the relevancies between the candidate users and the target user. In some embodiments, the processing engine 112 may provide recommendations to the target user based on the preferences of one or more candidate user.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting.

Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

I claim:

1. A system comprising:
   at least one non-transitory storage medium including a set of instructions for determining an affinity between a target user and a candidate user;
   at least one processor in communication with the at least one non-transitory storage medium, wherein when executing the set of instructions, the at least one processor is configured to cause the system to:
      obtain a first set of service orders comprising a plurality of target service orders associated with the target user and a plurality of candidate service orders associated with the candidate user within a predetermined time period, wherein the method of obtaining the first set of service orders comprises:
         determining whether the candidate user is a colleague or a family member of the target user;
         in response to determining that the candidate user is a colleague or a family member of the target user, determining a work address or a family address corresponding to both the target user and the candidate user; and
         excluding a second set of service orders from the obtained first set of service orders, each of the service orders from the excluded second set of service orders is excluded upon determining that a start location of each of the second set of service orders corresponds to the work address or family address;
      wherein each of the plurality of target service orders and the plurality of candidate service orders is an order for an on-demand transportation service provided online and includes a start location and a start time;

select one or more relevant service orders from the plurality of candidate service orders based on the plurality of target service orders, wherein for each of the one or more relevant service orders, a time difference between the start time of the relevant service order and the start time of one of the plurality of target service orders is less than a time threshold, or a location difference between the start location of the relevant service order and the start location of one of the plurality of target service orders is less than a location threshold;
determine the affinity between the target user and the candidate user based on the one or more relevant service orders;
obtain a normalization parameter corresponding to a user level of the target user;
determine a normalized affinity between the target user and candidate user based on the normalization parameter; and
provide personalized recommendations for the target user based upon the normalized affinity between the target user and a relevancy determined for the candidate user.

2. The system of claim 1, wherein to determine an affinity between the target user and the candidate user based on the one or more relevant service orders, the at least one processor is further configured to cause the system to:
for each of the one or more relevant service orders, determine a first order affinity based on the time difference and the time threshold or a second order affinity based on the location difference and the location threshold;
determine the affinity between the target user and the candidate user based on one or more first order affinities or one or more second order affinities.

3. The system of claim 1, wherein the at least one processor is further configured to cause the system to:
determine a candidate user set including a plurality of candidate users;
determine a plurality of affinities between the target user and the plurality of candidate users;
determine a sum of the plurality of affinities;
determine a ratio of the affinity of each candidate user to the sum of the plurality of affinities;
determine normalized affinities for the candidate user set by determining a normalized affinity between the target user and each candidate user in the candidate user set based on the ratio and the normalization parameter.

4. The system of claim 3, wherein to obtain a normalization parameter, the at least one processor is further configured to cause the system to:
determine an average number of service orders per capita for the plurality of candidate users within the predetermined time period;
obtain a number of the plurality of target service orders; and
determine the normalization parameter based on the average number of service orders per capita and the number of the plurality of target service orders.

5. The system of claim 3, wherein the at least one processor is further configured to cause the system to:
determine a relevancy between the target user and each candidate user hi the candidate user set based on the normalized affinity for each candidate user; and
provide personalized recommendations for the target user based upon the normalized affinities and the relevancy between the target user and each candidate user.

6. The system of claim 1, wherein the at least one processor is further configured to cause the system to:
obtain target wireless local area network (LAN) connection data associated with the target user;
obtain candidate wireless LAN connection data associated with the candidate user;
determine whether there is wireless LAN interconnection data between the target user and the candidate user based on the target wireless LAN connection data and the candidate wireless LAN connection data, wherein the wireless LAN interconnection data includes the number of times the target user and the candidate user connect to the same wireless LAN; and
in response to the determination that there is wireless LAN interconnection data between the target user and the candidate user, increase the affinity between the target user and the candidate user based on the wireless LAN interconnection data.

7. The system of claim 1, wherein the candidate user is a colleague of the target user, a family member of the target user, or has shared a red-packet with the target user.

8. A method for determining an affinity between a target user and a candidate user, the method being implemented on a computing device having at least one processor, at least one storage medium, and a communication platform connected to a network, the method comprising:
obtaining a first set of service orders comprising a plurality of target service orders associated with the target user and a plurality of candidate service orders associated with the candidate user within a predetermined time period, wherein the method of obtaining the first set of service orders comprises:
determining whether the candidate user is a colleague or a family member of the target user;
in response to determining that the candidate user is a colleague or a family member of the target user, determining a work address or a family address corresponding to both the target user and the candidate user; and
excluding a second set of service orders from the obtained first set of service orders, each of the service orders from the excluded second set of service orders is excluded upon determining that a start location of each of the second set of service orders corresponds to the work address or family address;
wherein each of the plurality of target service orders and the plurality of candidate service orders is an order for an on-demand transportation service provided online and includes a start location and a start time;
selecting one or more relevant service orders from the plurality of candidate service orders based on the plurality of target service orders, wherein for each of the one or more relevant service orders, a time difference between the start time of the relevant service order and the start time of one of the plurality of target service orders is less than a time threshold, or a location difference between the start location of the relevant service order and the start location of one of the plurality of target service orders is less than a location threshold;
determining the affinity between the target user and the candidate user based on the one or more relevant service orders;
obtaining a normalization parameter corresponding to a user level of the target user;

determining a normalized affinity between the target user and candidate user based on the normalization parameter; and providing personalized recommendations for the target user based upon the normalized affinity between the target user and a relevancy determined for the candidate user.

9. The method of claim 8, wherein the determining the affinity between the target user and the candidate user based on the one or more relevant service orders includes:

for each of the one or more relevant service orders, determining a first order affinity based on the time difference and the time threshold or a second order affinity based on the location difference and the location threshold; and determining the affinity between the target user and the candidate user based on one or more first order affinities or one or more second order affinities.

10. The system of claim 8, wherein the method further includes:

determining a candidate user set including a plurality of candidate users;

determining a plurality of affinities between the target user and the plurality of candidate users;

determining a sum of the plurality of affinities;

determining a ratio of the affinity of each candidate user to the sum of the plurality of affinities;

determining normalized affinities for the candidate user set by determining a normalized affinity between the target user and each candidate user in the candidate user set based on the ratio and the normalization parameter.

11. The method of claim 10, wherein the obtaining the normalization parameter includes:

determining an average number of service orders per capita for the plurality of candidate users within the predetermined time period;

obtaining a number of the plurality of target service orders; and determining the normalization parameter based on the average number of service orders per capita and the number of the plurality of target service orders.

12. The system of claim 10, wherein the method further includes:

determining a relevancy between the target user and each candidate user in the candidate user set based on the normalized affinity for each candidate user; and providing personalized recommendations for the target user based upon the normalized affinities and the relevancy between the target user and each candidate user.

13. The method of claim 8, wherein the method further includes:

obtaining target wireless local area network (LAN) connection data associated with the target user;

obtaining candidate wireless LAN connection data associated with the candidate user;

determining whether there is wireless LAN interconnection data between the target user and the candidate user based on the target wireless LAN connection data and the candidate wireless LAN connection data, wherein the wireless LAN interconnection data includes the number of times the target user and the candidate user connect to the same wireless LAN; and in response to the determination that there is wireless LAN interconnection data between the target user and the candidate user, increasing the affinity between the target user and the candidate user based on the wireless LAN interconnection data.

14. The method of claim 8, wherein the candidate user is a colleague of the target user, a family member of the target user, or has shared a red-packet with the target user.

15. A non-transitory computer readable medium, comprising a set of instructions for determining an affinity between a target user and a candidate user, wherein when executed by at least one processor, the set of instructions directs the at least one processor to perform acts of:

obtaining a first set of service orders comprising a plurality of target service orders associated with the target user and a plurality of candidate service orders associated with the candidate user within a predetermined time period, wherein the method of obtaining the first set of service orders comprises:

determining whether the candidate user is a colleague or a family member of the target user;

in response to determining that the candidate user is a colleague or a family member of the target user, determining a work address or a family address corresponding to both the target user and the candidate user; and excluding a second set of service orders from the obtained first set of service orders, each of the service orders from the excluded second set of service orders is excluded upon determining that a start location of each of the second set of service orders corresponds to the work address or family address;

wherein each of the plurality of target service orders and the plurality of candidate service orders is an order for an on-demand transportation service provided online and includes a start location and a start time;

selecting one or more relevant service orders from the plurality of candidate service orders based on the plurality of target service orders, wherein for each of the one or more relevant service orders, a time difference between the start time of the relevant service order and the start time of one of the plurality of target service orders is less than a time threshold, or a location difference between the start location of the relevant service order and the start location of one of the plurality of target service orders is less than a location threshold;

determining the affinity between the target user and the candidate user based on the one or more relevant service orders;

obtaining a normalization parameter corresponding to a user level of the target user;

determining a normalized affinity between the target user and candidate user based on the normalization parameter; and providing personalized recommendations for the target user based upon the normalized affinity between the target user and a relevancy determined for the candidate user.

* * * * *